United States Patent [19]

Jorgensen

[11] 3,931,003

[45] Jan. 6, 1976

[54] ION EXCHANGER FOR THE TREATMENT OF WASTE WATER

[76] Inventor: Sven Erik Jorgensen, Langkaer Vaenge 9, DK-3500 Vaerlose, Denmark

[22] Filed: Feb. 27, 1974

[21] Appl. No.: 446,476

[30] Foreign Application Priority Data
Mar. 2, 1973 United Kingdom............... 10248/73

[52] U.S. Cl. ....................... 210/28; 210/37; 210/38
[51] Int. Cl.² ......................................... B01D 15/04
[58] Field of Search ............. 210/28, 37, 38, 39, 24, 210/42

[56] References Cited
UNITED STATES PATENTS

| | | | |
|---|---|---|---|
| 3,192,156 | 6/1965 | Joyce .................................. | 210/63 |
| 3,498,911 | 3/1970 | Kikuchi et al. ..................... | 210/38 |
| 3,801,499 | 4/1974 | Luck ................................... | 210/28 X |

OTHER PUBLICATIONS

Kučera & Hanus, "Isolation of Glucose with the Use of Cellulose", J. Appl. Chem. Biotechnol., (1971), Vol. 21, Dec., No. 12, pp. 347–348.

*Primary Examiner*—John Adee
*Assistant Examiner*—Ethel R. Cross

[57] ABSTRACT

An ion-exchanger material consisting of a cellulose ion-exchanger impregnated with $\gamma$-manganese dioxide.

A method for the treatment of waste water to remove dissolved high molecular organic compounds, ammonium and phosphate ions therefrom, comprising a pretreatment of said waste water with a chemical selected from the group consisting of precipitating agents and flocculating agents and subsequently passing the pretreated water through a bed consisting of a cellulose ion-exchanger impregnated with $\gamma$-manganese dioxide.

10 Claims, No Drawings

ION EXCHANGER FOR THE TREATMENT OF WASTE WATER

BACKGROUND OF THE INVENTION

In a prior art process waste water is subjected to a pretreatment, e.g. a mechanical or biological pretreatment, so as to remove solid high molecular compounds from the waste water. Subsequently, the pretreated waste water is passed through a bed of ion exchanger materials to remove dissolved organic compounds, salts, toxic compounds, heavy metals etc. therefrom.

Among the ion exchanger materials which have been used for said purpose are anion exchanger materials based on polystyrene, clinoptinolit and cellulose ion exchangers.

Polystyrene ion exchangers are suitable for the removal of phosphate ions and also to some extent toxic compounds and heavy metals in the form of anions, such as chromate ions.

However, only the phosphate ions are removed to a satisfactory degree, viz. of the order of 90% or above.

Clinoptinolit is capable of removing ammonium ions, but has substantially no effect on the remaining contaminating substances. Cellulose ion exchangers are capable of removing proteins but remove substantially no other compounds or ions.

British Patent Specification No. 674.430 discloses a process for the removal of ammonia from water in which water is passed through a bed of a base-exchange material which has taken up manganese ions and then been subjected to an oxidizing treatment to convert the manganese into oxides.

Furthermore, U.S. Pat. No. 3,222,277 discloses a method of removing dissolved iron from water containing the same by passing the water through activated carbon particles impregnated with manganese dioxide which has been formed in situ.

The object of the present invention is to provide an ion exchanger material capable of removing both ammonia, phosphate ions and dissolved high molecular proteins from waste water containing the same.

Another object of the invention is to provide an ion exchanger material which can be eluated and regenerated in one step.

A further object of the invention is to provide a method of treating waste water in one step to remove both ammonia, phosphate ions and dissolved high molecular proteins.

SUMMARY OF THE INVENTION

The ion exchanger material of the invention consists of a cellulose ion-exchanger impregnated with γ-manganese dioxide.

Surprisingly, it has been found that said novel ion exchanger material is capable of removing not only ammonia and dissolved high molecular proteins but also phosphate ions from waste water containing the same. Thus, the ion exchanger material of the invention is capable of taking up about 150 mg P per liter ion exchanger material from a solution containing phosphate ions. At the same time, ammonium ions are taken up in an amount of up to about 2500 mg $NH_4^+$ per liter.

The ion exchanger material of the invention presents the additional advantage that the support material can be prepared from unexpensive starting materials, viz. cellulose products.

The preparation of the ion exchanger material of the invention is preferably carried out by adding to a mixture of a cellulose ion exchanger and a base, such as NaOH, potassium permanganate and by heating said mixture to a temperature of 80°–95°C. Subsequently, the solid product is separated and washed with water.

In a particularly preferred embodiment of the ion exchanger material of the invention the cellulose ion-exchanger consists of bark or sulphonated bark.

Thus, bark, e.g. from spruce, may be cut into small pieces and treated with sulphuric acid of a concentration of between 50 and 80% for a period of 30–120 minutes. Even untreated bark from spruce has an efficiency as far as the uptake of proteins is concerned of 0.3 milliequivalents per liter. The treatment with sulphuric acid as described above increases said efficiency up to about 0.6 milliequivalents per liter.

Another aspect of the invention relates to a method for the treatment of waste water containing dissolved high molecular organic compounds, ammonium ions and phosphate ions to remove these compounds and ions therefrom.

This method comprises the steps of subjecting waste water to a treatment with a chemical selected from the group consisting of precipitating agents and flocculating agents and subsequently passing the pretreated water through a bed consisting of a cellulose ion exchanger impregnated with γ-manganese dioxide.

In a preferred embodiment of the method of the invention the effluent from the impregnated cellulose ion-exchanger is further passed through a bed consisting of activated carbon impregnated with γ-manganese dioxide. By passing pretreated waste water through the above mentioned beds in the sequence described above, a particularly efficient treatment of the waste water is achieved. The treatment of the water with activated carbon impregnated with γ-manganese dioxide results in an even more efficient removal of phosphate and ammonium ions and also in the removal of dissolved low molecular compounds.

A special advantage of the ion-exchanger material of the invention is that it can be eluated by means of sodium hydroxide. By suitably adjusting the eluation process, all phosphate and ammonium nitrogen ions can be removed during said eluation.

The ammonium compounds which at the pH value of the eluation liquid are converted into ammonia can be removed from the eluation liquid by air blowing and preferably while heating the eluation liquid to for example 35°–40°C.

The organic substances as well as the phosphates can be removed from the eluation liquid by adding calcium hydroxide thereto. By said addition about 80% of the organic compounds and 90% of the phosphates are precipitated. If the eluation liquid is allowed to stand for some hours, a clear phase which constitutes 75–80% of the total volume and a sludge phase are obtained. In practice it has been found that the γ-manganese dioxide slowly is removed together with water. However, the amounts of manganese dioxide removed are very small. Thus, a concentration of Mn of below 0.1 mg per liter has been found in the treated water. The removal of manganese is thus insignificant as far as the quality of the water is concerned. However, it has an adverse effect on the capacity of the ion-exchanger material. Thus, when the ion-exchanger material has been eluated ten times, the capacity has been reduced to 95% of the initial capacity, and after 15 additional eluations the capacity has been reduced to about 88%. In order to counteract this decrease of capacity, potassium permanganate may be added to the waste water before it enters the manganese dioxide bed or beds.

amounts of ammonium and phosphate ions to determine the efficiency and capacity of said material.

The results obtained will appear from the following table I:

TABLE I

| Start concentration, mg/l, of | | | | | | | |
|---|---|---|---|---|---|---|---|
| | $N-NH_4^+$ | 100 | 30 | 10 | 10 | 10 | 1 |
| | $P-PO_4^{3-}$ | 1.0 | 1.0 | 1.0 | 10 | 30 | 10 |
| Concentration, mg/l, after passage of | | | | | | | |
| 1 liter | $N-NH_4^+$ | 6 | 1 | 0.5 | 0.6 | 0.5 | 0.1 |
| | $P-PO_4^{3-}$ | 0.05 | 0.04 | 0.05 | 0.5 | 1.0 | 1.0 |
| 5 liters | $N-NH_4^+$ | 10 | 3 | 1.0 | 1.1 | 1.0 | 0.1 |
| | $P-PO_4^{3-}$ | 0.05 | 0.06 | 0.1 | 1.2 | 3.0 | 4.8 |
| 10 liters | $N-NH_4^+$ | 23 | 5 | 2.0 | 1.2 | 2.1 | 0.2 |
| | $P-PO_4^{3-}$ | 0.07 | 0.06 | 0.2 | 3.5 | 8.0 | 9.6 |
| 15 liters | $N-NH_4^+$ | 47 | 8 | 3.2 | 2.9 | 3.0 | 0.2 |
| | $P-PO_4^{3-}$ | 0.10 | 0.12 | 0.5 | 8.9 | 12.5 | 8.9 |
| 20 liters | $N-NH_4^+$ | 82 | 26 | 5 | 4.6 | 6.5 | 0.2 |
| | $P-PO_4^{3-}$ | 0.18 | 0.2 | 0.9 | 9.5 | 27.0 | 10.3 |
| Capacity, mg/l of | $N-NH_4^+$ | 7300 | 2700 | 1200 | 1200 | 1200 | 200 |
| | $P-PO_4^{3-}$ | 200 | 190 | 100 | 600 | 1300 | 200 |

Such addition may be effected at intervals, e.g. at every 20th regeneration and the potassium permanganate may be added in an amount of about 50 mg potassium permanganate per liter waste water. Such an addition is sufficient to maintain the full capacity of the manganese dioxide contained in the ion-exchanger material. This addition corresponds to an average addition of about 2.5 mg potassium permanganate per liter waste water.

EXAMPLE 1

300 l sulfonated lignocellulose (chloride number: 21) were mixed with 175 l m NaOH solution and the mixture was heated to 80°C. $KMnO_4$ powder was added to said mixture during a period of 2 hours, the total amount of $KMnO_4$ being 45 kg. After the addition of $KMnO_4$ had been completed the mixture thus formed was left to stand at 80°–95°C for a period of 1 hour. During the addition of $KMnO_4$ and the following reaction time air was passed through the mixture to stir it. The total reaction time was 3.5 hours. The solid product was then separated and washed with water to remove the base and fine particles.

100 ml portions of the material thus obtained were used for the treatment of solutions containing varying The capacity of the ion-exchanger material is defined as the total amount taken up by the ion-exchanger material at the time at which the efficiency has decreased to 80%.

As will appear from the data set forth in table 2, the removal of $NH_4^+$ is almost independent of the $PO_4^{3-}$ concentration whereas the removal of $PO_4^{3-}$ increases with increasing $NH_4^+$ concentration. Without being bound to this theory it is assumed that $NH_4^+$ is taken up partly by adsorption and partly by surface precipitation as $MnNH_4PO_4$ whereas $PO_4^{3-}$ can be removed by surface precipitation only.

An ion-exchanger material prepared as described above was used for the treatment of municipal waste water which had been pretreated with a precipitating agent and subsequently passed through a settling tank.

The pretreated water was subjected to the following treatments 1. with a cellulose ion-exchanger,
2. with a cellulose ion-exchanger coated with $MnO_2$ and
3. with a cellulose ion-exchanger coated with $MnO_2$ and then with activated carbon coated with $MnO_2$.

The ratio of the volume to be treated to the volume of the ion-exchanger material was 100:1.

The data obtained will appear from the following table II:

TABLE II

| | Pretreated waste water | After passage through a cellulose ion-exchanger | After passage through a cellulose ion-exchanger coated with $MnO_2$ | After passage through a cellulose ion-exchanger coated with $MnO_2$ and subsequently through activated carbon coated with $MnO_2$ |
|---|---|---|---|---|
| $KMnO_4$ value, mg $O_2$/l | 81 | 56 | 50 | 10 |
| $BOD_5$ value, mg $O_2$/l | 92 | 52 | 50 | 6 |
| Protein concentration, mg/l | 6 | 0.8 | 0.8 | 0.6 |
| N—total, mg/l | 32 | 25 | 8.6 | 2.1 |

TABLE II-continued

|  | Pre-treated waste water | After passage through a cellulose ion-exchanger | After passage through a cellulose ion-exchanger coated with $MnO_2$ | After passage through a cellulose ion-exchanger coated with $MnO_2$ and subsequently through activated carbon coated with $MnO_2$ |
|---|---|---|---|---|
| $N-NH_4^+$, mg/l | 26 | 24 | 6.9 | 1.6 |
| $P-PO_4^{3-}$, mg/l | 0.82 | 0.79 | 0.12 | 0.06 |
| COD value, mg $O_2$/l | 250 | 156 | 156 | 30 |
| P total, mg/l | 0.96 | 0.92 | 0.15 | 0.04 |

As will appear from the data contained in table II the total nitrogen and phosphorous contents were significantly reduced by the cellulose ion-exchanger coated with $MnO_2$. This effect is further increased by passing the effluent from the cellulose ion-exchanger coated with $MnO_2$ through the activated carbon coated with $MnO_2$.

The sequence of said treatments is essential because the cellulose ion-exchanger is much less sensitive to clogging by high molecular organic compounds than the activated carbon.

EXAMPLE II

Fish-farming water was treated by being passed through a bed consisting of sulfonated lignocellulose coated with $\gamma$-$MnO_2$ and subsequently through a bed consisting of activated carbon coated with $MnO_2$. The water was passed through each bed at a flow rate of 6 m³ per hour. After a period of 3 hours the total amount of water had been treated once in each bed.

The results obtained will appear from the following table III:

TABLE III

|  | $KMnO_4$ value mg $O_2$/l | COD value mg $O_2$/l | P, mg/l | $N-NH_4^+$ mg/l |
|---|---|---|---|---|
| Before treatment | 30 | 75 | 0.8 | 6 |
| After treatment | 8 | 18 | 0.05 | 0.2 |

As will appear from said data the concentration of both P and $N-NH_4^+$ is substantially reduced as a result of the above mentioned treatments. Also the contents of high molecular organic compounds is substantially reduced.

I claim:

1. A method for the treatment of waste water to remove dissolved high molecular weight organic compounds, ammonium ions and phosphate ions therefrom which comprises subjecting the waste water to a treatment with a chemical selected from the group consisting of precipitating agents and flocculating agents and subsequently passing the pretreated water through a bed consisting of a cellulose ion-exchanger impregnated with $\gamma$-manganese dioxide.

2. A method according to claim 1, where in the water which has been treated by passing through the bed consisting of a cellulose ion-exchanger impregnated with $\gamma$-manganese dioxide is subsequently passed through a bed consisting of activated carbon impregnated with $\gamma$-manganese dioxide.

3. A method for the treatment of waste water to remove dissolved, high molecular weight organic compounds, ammonium ions and phosphate ions therefrom which comprises passing the water through a bed of cellulose ion-exchange material impregnated with $\gamma$-manganese dioxide.

4. The method of claim 3, wherein the water is further treated by subsequently passing it through a bed of activated carbon impregnated with $\gamma$-manganese dioxide.

5. The method of claim 3, wherein the cellulose ion-exchange material is bark.

6. The method of claim 3, wherein the cellulose ion-exchange material is sulphonated bark.

7. The method of claim 6, wherein the sulphonated bark is produced by treating bark with concentrated sulphuric acid having a concentration of about 50 to 80% for a period of from 30 to 120 minutes.

8. the method of claim 3, wherein potassium permanganate is added to the waste water before it is passed through the bed of ion-exchange material.

9. The method of claim 3, wherein the high molecular weight organic compounds are high molecular weight proteins.

10. The method of claim 3, wherein the waste water is subjected to chemical pretreatment prior to passing the water through the ion-exchange material.

* * * * *